United States Patent
Singh et al.

(10) Patent No.: US 9,654,331 B1
(45) Date of Patent: May 16, 2017

(54) SYSTEM AND METHOD FOR RECOVERY OF CUSTOMER PREMISE EQUIPMENT INFORMATION ON AN ACCESS CONCENTRATOR

(75) Inventors: Hemant Singh, Westford, MA (US); William Beebee, Lowell, MA (US); Madhu Sudan, San Jose, CA (US); Chad Mikkelson, Arlington, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 617 days.

(21) Appl. No.: 13/358,190

(22) Filed: Jan. 25, 2012

Related U.S. Application Data

(60) Provisional application No. 61/512,287, filed on Jul. 27, 2011.

(51) Int. Cl.
*G06F 15/173* (2006.01)
*H04L 29/08* (2006.01)

(52) U.S. Cl.
CPC .............. *H04L 29/08072* (2013.01)

(58) Field of Classification Search
CPC .......... H04L 29/08072; H04L 29/06
USPC .......... 709/224
See application file for complete search history.

(56) References Cited

U.S. PATENT DOCUMENTS

| | | | | |
|---|---|---|---|---|
| 8,140,710 B2* | 3/2012 | Ikeda | .................. | H04L 12/2803 370/338 |
| 2006/0184692 A1* | 8/2006 | Ikeda | .................. | H04L 12/2803 709/245 |
| 2006/0221975 A1* | 10/2006 | Lo et al. | ..................... | 370/395.5 |
| 2007/0022032 A1 | 1/2007 | Anderson et al. | | |
| 2007/0047586 A1 | 3/2007 | Tieman et al. | | |
| 2007/0189193 A1* | 8/2007 | Previdi | ............... | H04L 12/1868 370/256 |
| 2008/0235746 A1 | 9/2008 | Peters et al. | | |
| 2009/0024758 A1* | 1/2009 | Levy-Abegnoli et al. | ... | 709/237 |
| 2009/0132696 A1* | 5/2009 | Cankaya et al. | .............. | 709/224 |
| 2009/0147751 A1* | 6/2009 | Gurusamy | ............ | H04W 8/082 370/331 |
| 2010/0014442 A1* | 1/2010 | Ashwood-Smith | ........... | 370/255 |
| 2010/0020821 A1* | 1/2010 | Droms et al. | ................. | 370/465 |
| 2010/0293257 A1* | 11/2010 | Kinnear et al. | ............... | 709/221 |
| 2011/0116387 A1 | 5/2011 | Beeco et al. | | |
| 2011/0119375 A1 | 5/2011 | Beeco et al. | | |
| 2011/0119517 A1 | 5/2011 | Beeco et al. | | |
| 2011/0286345 A1 | 11/2011 | Goue et al. | | |
| 2012/0307841 A1* | 12/2012 | Guo et al. | ..................... | 370/466 |

\* cited by examiner

*Primary Examiner* — June Sison
*Assistant Examiner* — Steven Nguyen
(74) *Attorney, Agent, or Firm* — Patent Capital Group

(57) ABSTRACT

A method is provided in one example and includes determining that an access concentrator has lost customer premise equipment information. The method also includes obtaining the customer premise equipment information that is lost by evaluating Neighbor Discovery data and dynamic host configuration protocol version six (DHCPv6) query data. In more specific implementations, the method may include communicating a Bulk Leasequery message; receiving a response to the Bulk Leasequery message; and filtering out cable modem identifiers from the response to the Bulk Leasequery message.

20 Claims, 12 Drawing Sheets

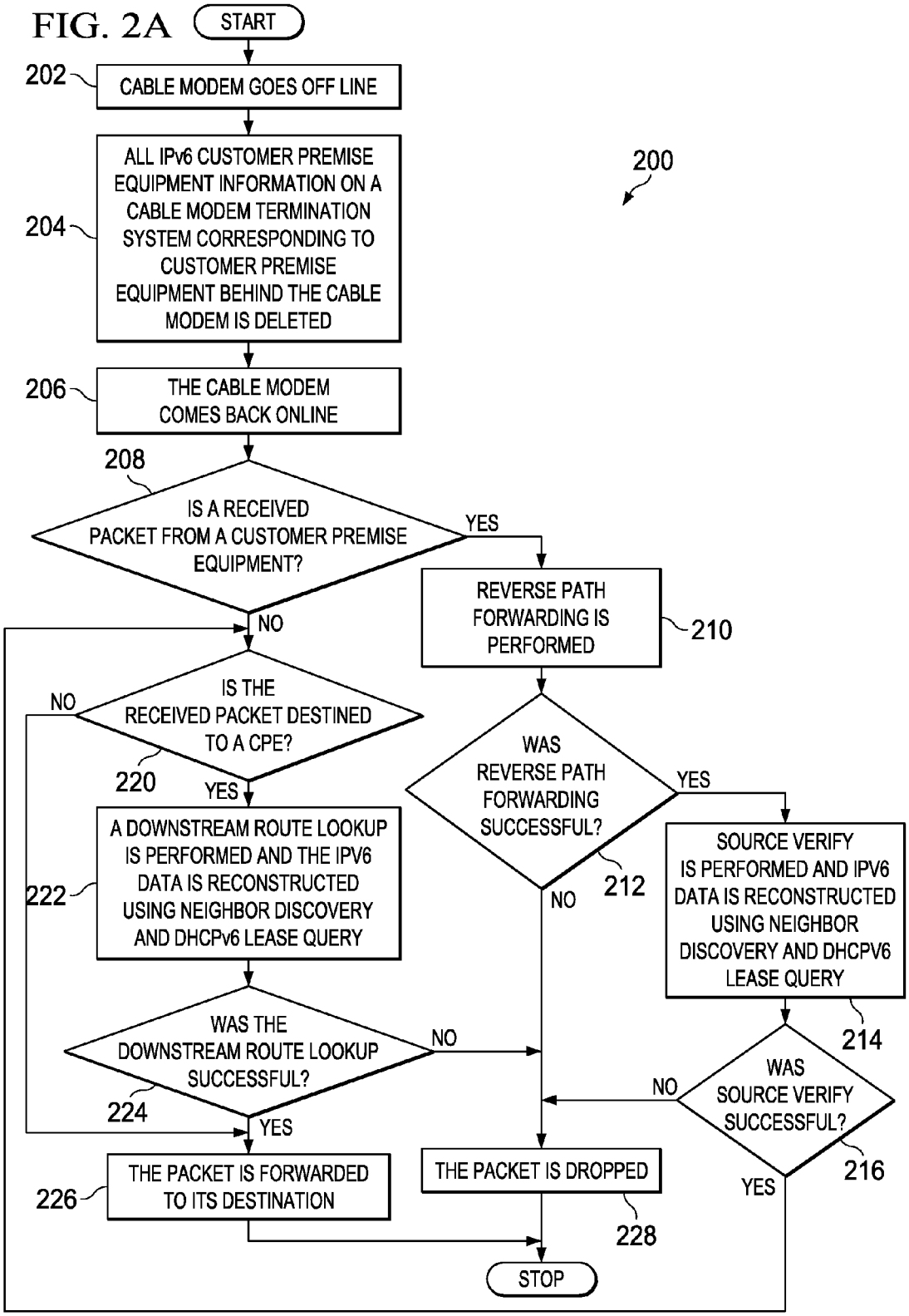

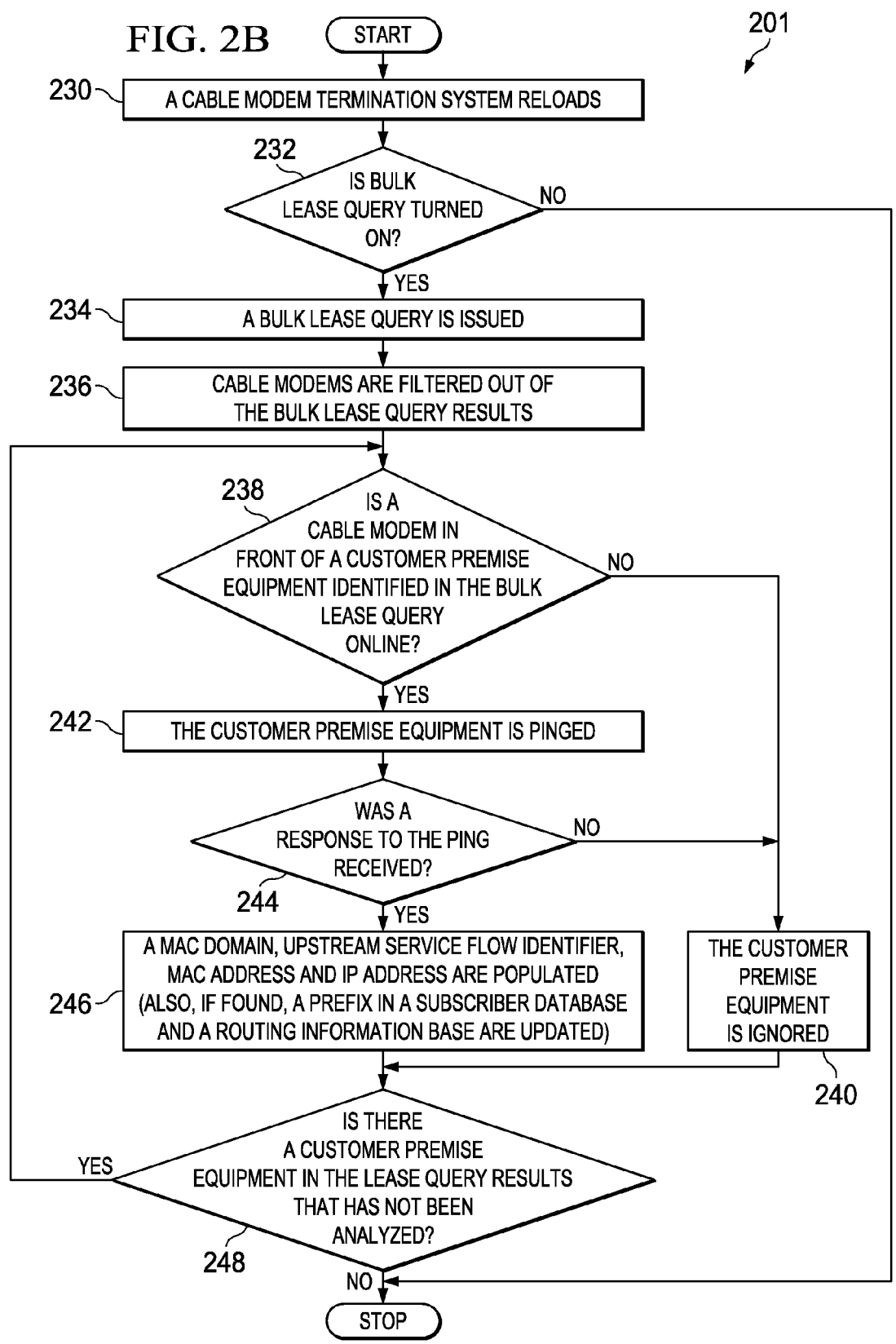

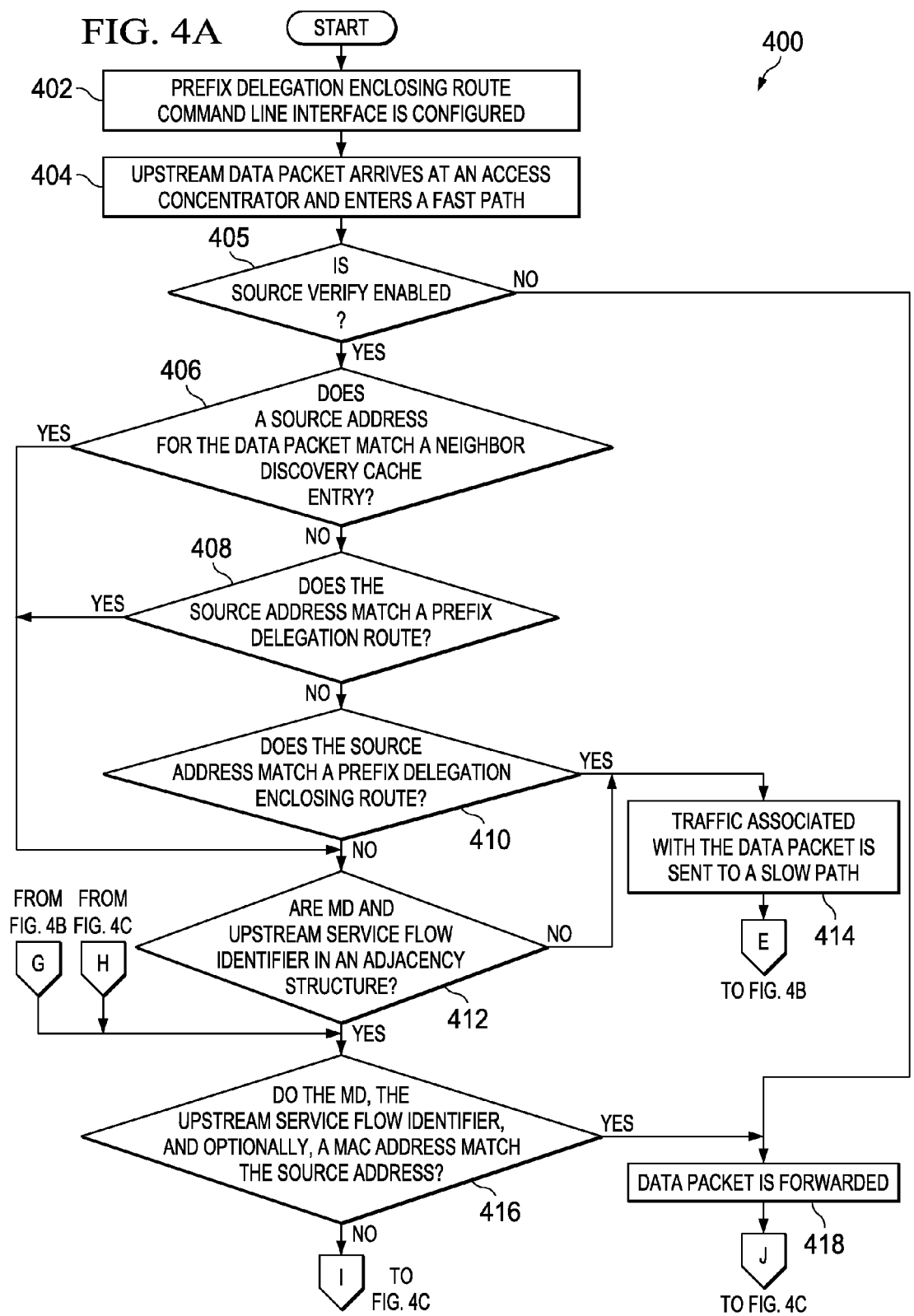

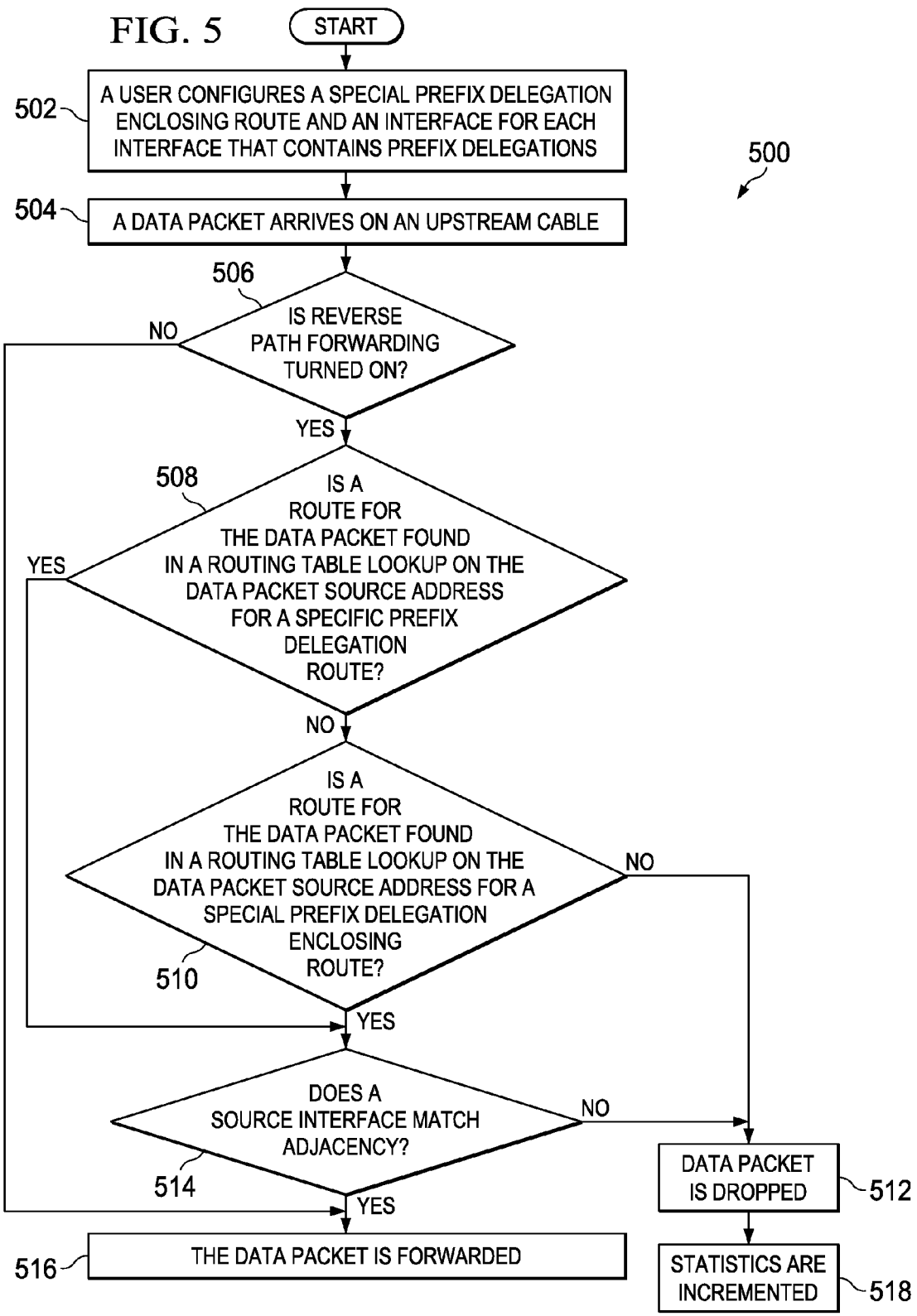

SYSTEM AND METHOD FOR RECOVERY OF CUSTOMER PREMISE EQUIPMENT INFORMATION ON AN ACCESS CONCENTRATOR

CROSS-REFERENCE TO RELATED APPLICATION

This application claims the benefit of priority under 35 U.S.C. §119(e) to U.S. Provisional Application Ser. No. 61/512,287, "A PROTOCOL FOR AUTOMATED RECOVERY OF LOST CPE INFORMATION ON AN ACCESS CONCENTRATOR" filed Jul. 27, 2011, which is hereby incorporated by reference in its entirety.

TECHNICAL FIELD

This disclosure relates in general to the field of communications and, more particularly, to a system and a method for recovery of customer premise equipment information on an access concentrator.

BACKGROUND

Internet Protocol version 6 (IPv6) is a version of the Internet Protocol developed by the Internet Engineering Task Force (IETF) that is designed to replace Internet Protocol version 4 (IPv4). IPv6 includes many enhancements to the Internet Protocol, including a much larger address space and improved routing protocols in an IP network. Computers that are connected to IP networks are configured such that they can communicate with other hosts. Part of this configuration includes the provisioning of information such as an IP address and a network address. In IPv6 networking, a prefix delegation (PD) is used to assign a network address prefix to a broadband subscriber. However, in certain cases, a PD route (and, therefore, the network address) for a customer premise equipment (CPE) can become lost at the access concentrator that is serving the subscriber.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2A is a simplified flowchart illustrating potential operations associated with the present disclosure;

FIG. 2B is another simplified flowchart illustrating potential operations associated with the present disclosure;

FIG. 4A is another simplified flowchart illustrating potential operations associated with the present disclosure;

FIG. 5 is another simplified flowchart illustrating potential operations associated with the present disclosure.

DETAILED DESCRIPTION OF EXAMPLE EMBODIMENTS

Overview

A method is provided in one example and includes determining that an access concentrator has lost customer premise equipment information. The method also includes obtaining the customer premise equipment information that is lost by evaluating Neighbor Discovery data and dynamic host configuration protocol version six (DHCPv6) query data. In more specific implementations, the method may include communicating a Bulk Leasequery message; receiving a response to the Bulk Leasequery message; and filtering out cable modem identifiers from the response to the Bulk Leasequery message.

In yet other examples, the method may include determining a status for a cable modem as being online or offline; determining that a received packet originated from a customer premise equipment; and using the Neighbor Discovery data and the DHCPv6 query data to obtain the customer premise equipment information. The method may also include determining a status for a cable modem as being online or offline; determining that a received packet was destined for a particular customer premise equipment; and performing a downstream route lookup operation to create a Neighbor Discovery message and a DHCPv6 Leasequery to obtain particular customer premise equipment information for the particular customer premise equipment.

Other example embodiments may include a method that compares a destination address of a packet with an entry in a neighbor cache to determine the customer premise equipment information. Additionally, the method may include comparing a source address of a packet with an entry in a neighbor cache to determine the customer premise equipment information. In certain cases, the method may include comparing a link-address in a DHCPv6 Leasequery to a plurality of addresses in the access concentrator to obtain the customer premises equipment information.

The method may also include determining if a packet destination address for a particular packet matches a prefix delegation route; determining if the packet destination address matches a prefix delegation enclosing route; determining whether a response is received for a DHCPv6 Leasequery; and dropping the particular packet. Additionally, the method may include determining whether a reverse path forwarding operation was successful; performing a source verify operation; and reconstructing IPv6 data for a particular customer premise equipment using particular Neighbor Discovery data and particular DHCPv6 Leasequery data.

Example Embodiments

Figure 1A:
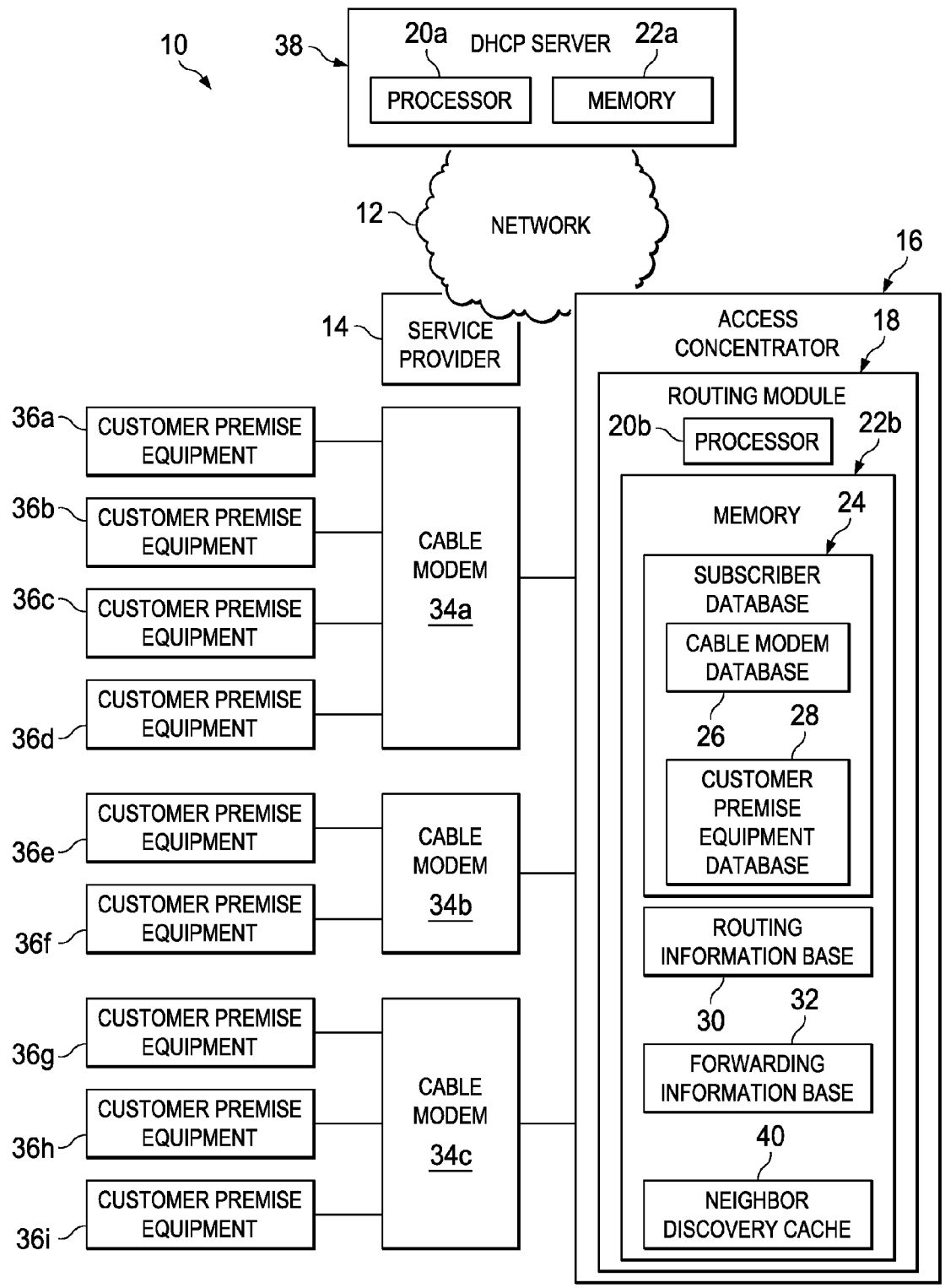
FIG. 1A is a simplified block diagram of a communication system for the recovery of lost customer premise equipment information on an access concentrator in accordance with one embodiment of the present disclosure.

Turning to FIG. 1A, FIG. 1A is a simplified block diagram of a communication system 10 for the recovery of lost customer premise equipment information on an access concentrator in accordance with one embodiment of the present disclosure. FIG. 1A includes a dynamic host configuration protocol (DHCP) server 38, a service provider 14, and an access concentrator 16. DHCP server 38, service provider 14, and access concentrator 16 are each coupled to a network 12, which facilitates their communications. In a particular implementation, DHCP server 38 is a DHCPv6 server. Access concentrator 16 could be any suitable router, switch, cable box, gateway, loadbalancer, a cable modem termination system (CMTS) router, digital subscriber line access multiplexer (DSLAM), cellular access concentrator, WiMAX access concentrator, firewall, inline service node, proxy, server, etc. Also provided in FIG. 1A is a plurality of cable modems 34a-c and instances of customer premise equipment (CPE) 36a-i. Cable modems 34a-c are in communication with access concentrator 16 and CPE 36a-i using any suitable links (wired, wireless, etc.).

DHCP server 38 may include a processor 20a and a memory 22a. Access concentrator 16 may include a routing module 18, which may include a processor 20b and memory 22b. Memory 22b may include a subscriber database 24, a routing information base (RIB) 30, a forwarding information base 32, and a neighbor discovery cache 40. In an embodiment, neighbor discovery cache 40, a neighbor solicitation element, and a neighbor advertisement element are reflective of a Neighbor Cache, a Neighbor Solicitation, and a Neighbor Advertisement respectively, as described in RFC-4861. Subscriber database 24 may include a cable modem database 26 and a customer premise equipment database 28.

In one particular instance, communication system 10 may be configured to recover lost CPE information. The lost CPE information can include any suitable data that characterizes, describes, or that is associated with a given CPE. The lost CPE information can be obtained (i.e., retrieved, identified, gleaned, etc.) using data from DHCPv6 messages (i.e., RFC 3315), Leasequery messages, Bulk Leasequery messages, and/or ND/ARP messages. For example, access concentrator 16 may issue a Leasequery (LQ) to DHCP server 38 with an internet protocol version 6 (IPv6) destination address contained in the packet to be forwarded. Using the response to the LQ from DHCP server 38, CPE information may be successfully obtained.

For purposes of illustrating certain example techniques of communication system 10, it is important to understand the communications that may be traversing the network. The following foundational information may be viewed as a basis from which the present disclosure may be properly explained. Access concentrator 16 (e.g., CMTS router, DSLAM, cellular access concentrator, WiMAX access concentrator, etc.) gleans (or snoops) DHCPv6 messages from/to CPE 36a-i (i.e., DHCPv6 clients) as a DHCPv6 relay agent. More specifically, a specific customer premise equipment 36a-i may be one that requests an IPv6 delegated prefix using IPv6 DHCPv6 PD, as described in RFC 3633. Access concentrator 16 is configured to perform a gleaning operation that involves parsing a DHCPv6 IA_PD option from RELAY-FORWARD/RELAY-REPLY messages between DHCP server 38 and one or more customer premise equipment 36a-i. A typical CPE 36a-i that requests the IA_PD DHCPv6 option is an IPv6 home router.

After parsing the IA_PD option, PD information (i.e., prefix, prefix length, and Valid Lifetime) can be added to subscriber database 24 in access concentrator 16, and a route for the prefix can be injected in RIB 30 of access concentrator 16. After a route for the prefix is injected in RIB 30, access concentrator 16 may send/receive data for a destination matching the prefix within the IPv6 prefix length of the prefix. In an embodiment, access concentrator 16 may also receive data from customer premise equipment 36a-i even if there is no injected route.

The prefix added to subscriber database 24 also serves to source verify packets upstream that are arriving at access concentrator 16. Further, once a prefix has been gleaned and added to subscriber database 24, and a route for the prefix is added to RIB 30, when the prefix has its Valid Lifetime expire on access concentrator 16, the prefix is deleted from RIB 30 and subscriber database 24. Also, the prefix is purged from subscriber database 24 and RIB 30 if a CPE 36a-i, which acquired the prefix, sends a DHCPv6 Release message.

For numerous reasons, the injected PD route may be lost from access concentrator 16. A PD route can be lost due to a reload of access concentrator 16 (e.g., CPEa-i may not re-provision after access concentrator 16 reloads). An exception to this would be an eRouter cable modem. An eRouter cable modem will not have a PD route lost on a reload of access concentrator 16 because the eRouter cable modem will reset the IPv6 CPE router when the cable modem's radio frequency (RF) interface is reset.

The route could also be lost from access concentrator 16 if DHCP server 38 was configured for unicast DHCPv6 operation and a DHCPv6 RENEW was not diverted to the routing processor (RP) SlowPath due to queue congestion (e.g., congestion at processor 20b in routing module 18) and/or a subsequent PD Valid Lifetime expiration causes a premature PD route expiration on access concentrator 16. These cases are not an exhaustive list of the possible causes of PD route loss. After a PD route loss, a user (e.g., a user of CPE 36a) could cycle the power on the home router and recover a lost PD route on access concentrator 16, but that can require a support call to service provider 14.

A lost PD route on access concentrator 16 may result in a stuck state, where hosts behind cable modems 34a-c may not be able to receive traffic. Access concentrator 16 often runs data forwarding in a FastPath using dedicated hardware. Any packets in the FastPath that need address resolution (or for which source verification is inconclusive in the FastPath) are diverted to a SlowPath that runs on a generic computer processing unit (CPU) such as the RP CPU.

Without an enclosing route, packets destined to any CPE behind a modem (e.g., CPEs 36a-c behind cable modem 34a) may be dropped by access concentrator 16 (NULL adjacency) in the FastPath. If the packets match a default route instead, then the packets would be sent out of the backhaul of access concentrator 16 and, further, would not be forwarded out of the cable interface to the modem. An enclosing route (such as a route with an IPv6 prefix of 2001:1/54 and an output interface of Bundle1) could enable packets to be diverted to the RP for processing. On the RP, the packet would be forwarded to the IPv6 code such as IPv6 RIB and forwarding information base (FIB), where the exact same problem would happen with the RIB (i.e., the packet would be forwarded to a default route or would be dropped).

In addition, PD prefix stability may become an issue when a specific cable modem is automatically load balanced between two access concentrators due to a node-split in a service provider deployment. If the specific cable modem has an IPv6 home router behind it (i.e., IPv6 CPE), when the specific cable modem moves from one access concentrator to another access concentrator, the service provider would prefer that the delegated prefix is retained. A node-split configuration has both access concentrators served by the same provisioning system that also includes an instance of DHCP server 38.

Consider an example case where a specific cable modem has moved from access concentrator A to access concentrator B, the PD route of the home router behind the cable modem has to be purged from access concentrator A. Also, after the cable modem is online on access concentrator B, the PD prefix and route has to be added to access concentrator B. When the cable modem moves to a different access concentrator, the home router does not become aware of such a move. The IPv6 Neighbor Discovery (ND, RFC 4861) stack running on a WAN interface of the home router may timeout Neighbor Unreachability Detection (i.e., NUD of RFC 4861) for the default router. Even so, when the home router receives a new router advertisement message (RA) from access concentrator B, the home router, (as provided in RFC 4861), takes a union of IPv6 ND information in the RA and, thus, no change occurs on the home router to alleviate/fix the lost PD route problem on the access concentrator. The home router is also not expected to reset its DHCPv6 client stack to initiate a new DHCPv6 IA PD request. Thus, access concentrator B is unable to recover the PD route for the home router after the move of this router's cable modem from access concentrator A. In an embodiment, a cable modem may move between two different L3 network interfaces on the same CMTS (intra-CMTS move).

Even though a rendezvous point (RP)-RP and line card (LC)-LC high-availability system can handle protocol prefix delegation (PD) route recovery through a stateful switchover, service providers may have requested the ability to recover PD routes quickly after access concentrator reloads. This would require an DHCPv6 Bulk Leasequery (Bulk LQ) after reload. (Note that Bulk LQ is specified in RFC 5460.) Additionally, a CPE router WAN interface may be unnumbered or numbered, which affects whether an IA_NA option is returned with the IA_PD on a DHCPv6 Unitary or Bulk LQ. An unnumbered WAN interface of a CPE router has no globally accessible IPv6 address assigned to the WAN interface. This does not affect the PD source verify, reverse path forwarding (RPF), or PD forwarding operation since the CPE router WAN interface address is neither the source address or the destination address of the packet being queried against the PD. For traffic sourced from (or destined to) the CPE router, bulk and unitary DHCPv6 LQ recovers the address directly from the IPv6 address included in the IA_NA option, not the prefix included in the IA_PD option.

In accordance with one example implementation, communication system 10 may resolve the aforementioned issues associated with recovering lost CPE information using a variety of tactics and techniques, as outlined in embodiments discussed herein. For example, during IPv6 PD route recovery, if the specific forwarding route does not exist in the FastPath M-TRIE, the diverted packet matches the aggregated PD route configured by the operator, and the PD route does not exist in the CPE database, then the access concentrator has to acquire knowledge of this PD route through some mechanism, or intelligence. An IETF-specified mechanism for accomplishing this involves DHCPv6 LQ, as described in RFC 5007. The access concentrator issues a LQ to the DHCPv6 server with the IPv6 destination address contained in the packet to be forwarded. The DHCPv6 server returns the IA_PD option of the enclosing PD route as matched by the DHCPv6 server. (This is described as QUERY_BY_ADDRESS in section 4.1.2.1 of RFC 5007.) This LQ result is populated in subscriber database 24 and RIB 30 in access concentrator 16.

On an RP, a packet is pulled from the SlowPath forwarding in the same way that the packet is pulled off the FastPath in order to then have a DHCPv6 LQ be initiated. During this DHCPv6 LQ initiation, the packet is held in a queue for resolution and, further, when DHCPv6 LQ resolves, then the packet can be forwarded. An alternative method to keeping the same behavior for FastPath and SlowPath (since the FastPath can use a different divert code for these packets) is that the SlowPath could switch on a divert code (instead of doing prefix matching). Note that DHCPv6 LQ and/or the PD enclosing route is used for an RPF check, an access concentrator downstream, FIB forwarding, and the access concentrator upstream source verification check.

Typically, an access concentrator can use DHCPv6 LQ to query and verify CPEs: not cable modems, since cable modems are known to the access concentrator's subscriber database by a DOCSIS state machine running between the access concentrator and the cable modem. Bulk LQ does not have a specific query type to respond with only CPE data and, thus, when a Bulk LQ is used, the DHCPv6 server returns both cable modem and CPE information. Returning cable modem information uses more bandwidth on the link between the access concentrator and the DHCP server, and also provides cable modem information that is not needed by the access concentrator. More resources are also consumed at the DHCP server to collect cable modem DHCP client information, which is not needed by the requestor of the Bulk LQ.

Bulk LQ can perform queries using a virtual interface global address (link-address), or for the access concentrator. At least two methods may be provided to have Bulk LQ return only CPE data: 1) (access concentrator changes) specific command line interface (CLI) under the access concentrator DHCPv6 relay agent network interface, where the CLI may use a separate link-address to be sent in the RELAY-FWD message differentiating device type; and 2) (access concentrator and DHCPv6 server changes) a separate and new DHCPv6 Bulk LQ query option added to the existing and future query types to store, communicate, and differentiate device type (such as cable modem, CPEs, etc.). The access concentrator DHCPv6 relay agent and the DHCPv6 server has device-type information since the access concentrator receives indicators (as to device type in DHCPv6 options) and also relays information to the DHCPv6 server.

Other scenarios that may use unitary and Bulk LQ include a service provider power outage combined with a cable modem move. One scenario is a service provider power outage combined with a CPE move. Another scenario involves a node split. Further, a packet may be sent to a CPE behind the CPE router and the CPE router may not be known to the access concentrator.

When a power outage causes at least two access concentrators to become dysfunctional (e.g., go down during the outage), a cable modem may move from access concentrator A to access concentrator B, and each can be served by the same DHCPv6 server. Each access concentrator uses Bulk LQ to recover CPE router PD routes when both concentrators start up again. Access concentrator A ends up with a ghost entry and access concentrator B does not have any entry. One solution to this problem is for access concentrator A to filter the results of the LQ and remove any CPEs behind cable modems that are offline. This may be done after most of the cable modems are online. A timer may be configured at the CLI to indicate the amount of time to wait after reload before initiating the Bulk LQ to ensure most of the cable modems are online. Access concentrator B uses unitary LQ and PD route recovery when traffic is sent to (or received from) the CPE.

Consider an example scenario in which a power outage causes at least two access concentrators to go down. During the outage, a CPE can move from behind cable modem-A on access concentrator A to behind cable modem-B on access concentrator B, each served by the same DHCPv6 server. Each access concentrator uses Bulk LQ to recover CPE router PD routes when both access concentrators start up again. Access concentrator A should ping the IA_NA address (corresponding to the same CPE router as the IA_PD was sent to) in order to find out that the address is no longer available. This ping requires a state machine on the access concentrator and works if the CPE router uses the numbered model (as recommended in cable deployments, but not necessarily used for all access networks). A separate solution would be provisioned to support the unnumbered model. This solution would involve changes to the access concentrator.

In another example, a cable modem participates in a node-split or load balancing (LB) operation performed, forcing a cable modem to move from access concentrator A to access concentrator B. As a result, the cable modem can T4 timeout on access concentrator A, and the corresponding CPE entries and PD routes would be deleted. On access concentrator B, when traffic is sent from or to the CPE, the PD and PD route are relearned through unitary DHCPv6 LQ.

In another example, a downstream packet can be destined to a CPE behind the CPE router. The IPv6 address, MAC address, MAC Domain, and SID of the CPE router would be unknown to the access concentrator. As a result, the access concentrator first sends a unitary LQ to the DHCPv6 server with the IPv6 destination address of the packet, which matches the IA_PD option of the CPE router. In an opaque field of the DHCPv6 Interface-id option available in the DHCPv6 LQ reply, the MAC address of the CPE router may have been saved. If saved, the MAC address of the CPE is added by the access concentrator to the DHCPv6 Interface-id option when the CPE performs DHCPv6 for IPv6 address and PD acquisition. The cable modem MAC address may also be available in the unitary LQ reply sent to the access concentrator (e.g., because a DOCSIS 3.0 CM MAC-ADDR DHCPv6 option is populated by the access concentrator, or other deployments may also define a broadband modem MAC-ADDR DHCPv6 option). From the cable MAC address, the access concentrator can search its subscriber database and find the MAC Domain and SID. Using the cable MAC Domain, SID, and the CPE router MAC address, the access concentrator can populate a route in the forwarding table (and the bundle interface forwarding table), and forward the packet that was kept in queue. Note that if a packet was not queued, then the access concentrator does not need to maintain LQ-specific state to handle this scenario.

In an embodiment, the base unitary DHCPv6 Leasequery may be modified from RFC 5007, and the base Bulk Leasequery Specification may be modified from RFC 5460. Note that the present disclosure can use certain formats and mechanisms to facilitate some of the operations discussed herein. Note that these formats and mechanisms (as well as additional features that may cooperate with the architecture discussed herein) are outlined in previous patent filings (such as Patent Publication No. 20100309813 entitled: Detection and Support of a Dual-Stack Capable Host (Ser. No. 12/480,623); Patent Publication No. 20090125957 entitled: Stateful DHCPv6 Relay Agent in a Cable Modem Termination System (Ser. No. 11/939,647)), both of which are hereby incorporated herein.

The 8-bit field of query-type (as defined in RFC 5007) can change to use four bits of 0 through 3 to signal new device types for use with Bulk Leasequery, as defined in RFC 5460. Three new device types of all devices (0000), a host (0001), STB (0010), and eMTA (0011) are defined to use the first four bits. The other bits still signal unitary and Bulk Leasequery query types. Note that this usage is backwards compatible with the existing query type option. Also note that four bits is an arbitrary choice, where different implementations could use different bits, but the choice should be consistent between the DHCPv6 server and the access concentrator. The access concentrator is the requestor that issues a DHCPv6 Leasequery to the DHCPv6 server.

Figure 1B:
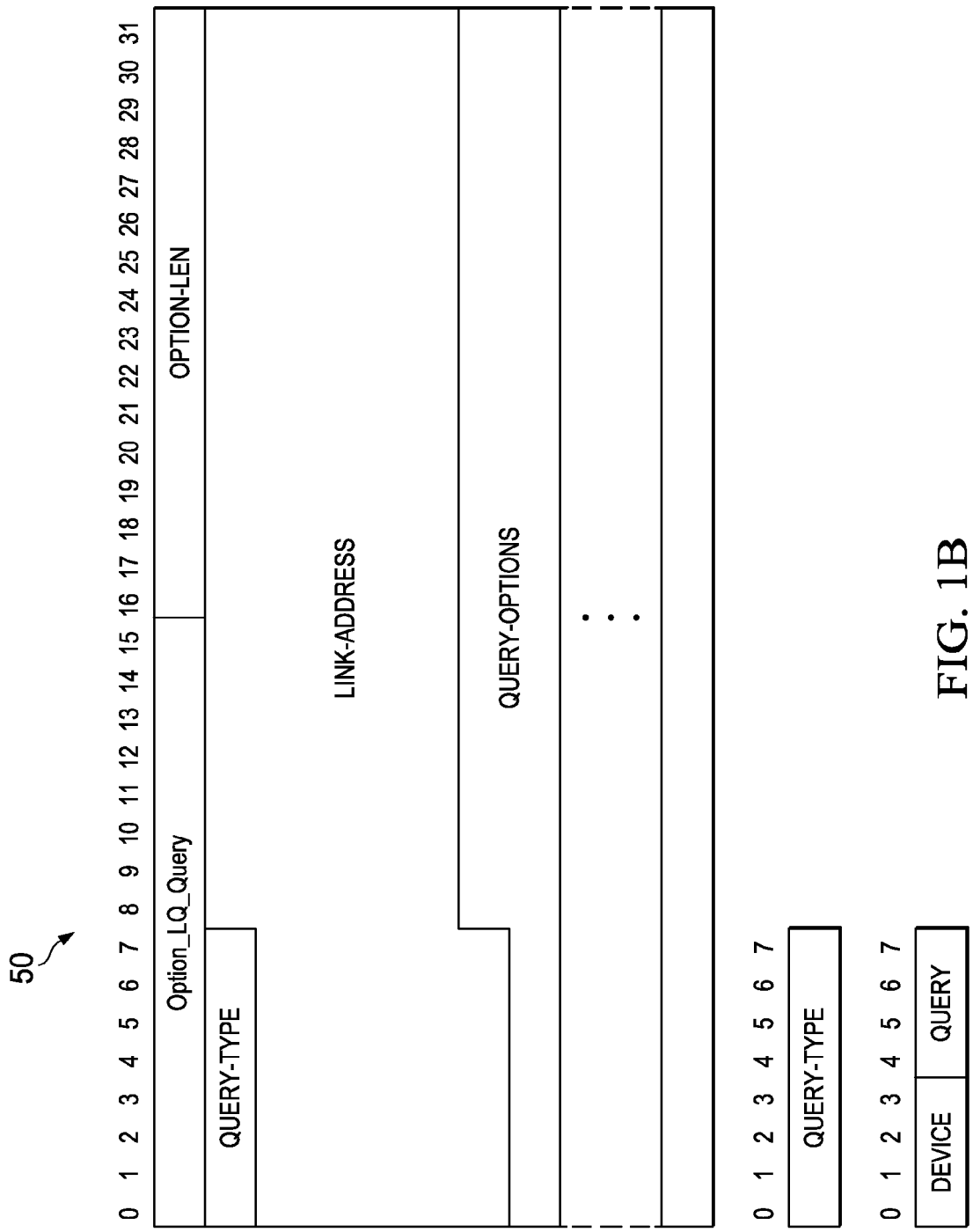
FIG. 1B is a simplified block diagram illustrating possible example details associated with communication system in accordance with one embodiment of the present disclosure.
Figure 1C:
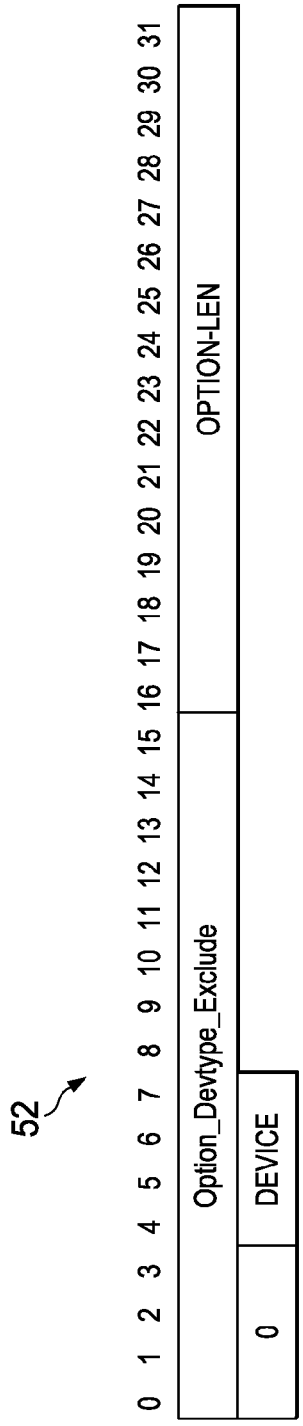
FIG. 1C is a simplified block diagram illustrating possible example details associated with communication system in accordance with one embodiment of the present disclosure.

Turning to FIG. 1B, FIG. 1B is a simplified block diagram illustrating possible example details associated with the communication system 10 in accordance with one embodiment of the present disclosure. More specifically, FIG. 1B illustrates one example of a format of a query option 50. Turning to FIG. 1C, FIG. 1C is a simplified block diagram illustrating possible example details associated with the communication system 10 in accordance with one embodiment of the present disclosure. More specifically, FIG. 1C illustrates an example of a format of a query option 52 having a device-type exclude option.

Figure 1D:
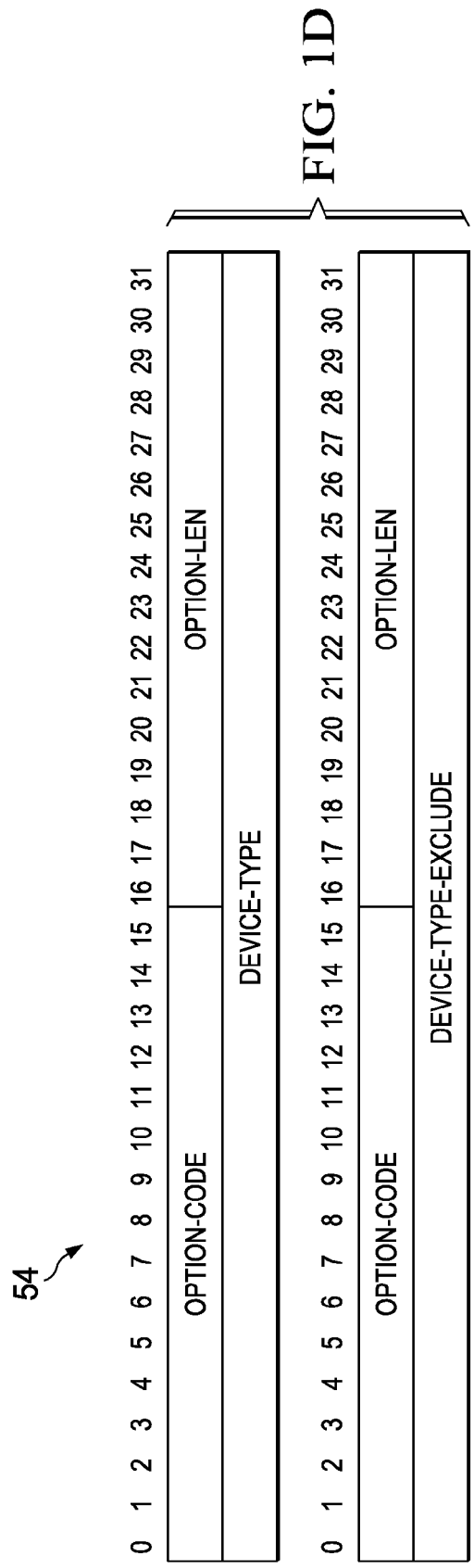
FIG. 1D is a simplified block diagram illustrating possible example details associated with communication system in accordance with one embodiment of the present disclosure.

Turning to FIG. 1D, FIG. 1D is a simplified block diagram illustrating possible example details associated with the communication system 10 in accordance with one embodiment of the present disclosure. More specifically, FIG. 1D illustrates another example of a format of a query option 54. In an embodiment, a DHCPv6 Vendor-Specific Option or a Vendor-Specific sub-option of an existing Vendor-Specific Option can be used to convey the device-type information to the DHCPv6 server to return (or to exclude) a certain device-type.

The examples provided in FIGS. 1B-1C should not limit the scope or inhibit the broad teachings of communication system 10 as potentially applied to a myriad of other formats for a query option. Although the present disclosure has been described in detail with reference to particular arrangements and configurations, these example configurations and arrangements may be changed significantly without departing from the scope of the present disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims. Before discussing additional flows associated with the architecture of FIG. 1A, a brief discussion is provided about some of the possible infrastructure that may be included in communication system 10. In one particular instance, communication system 10 can be associated with a service provider digital subscriber line (DSL) deployment. In other examples, communication system 10 would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures. Communication system 10 may include a configuration capable of transmission control protocol/internet protocol (TCP/IP) communications for the transmission and/or reception of packets in a network. Communication system 10 may also operate in conjunction with a user datagram protocol/IP (UDP/IP) or any other suitable protocol, where appropriate and based on particular needs.

Network 12 represents a series of points or nodes of interconnected communication paths for receiving and transmitting packets of information that propagate through communication system 10. Network 12 offers a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment using network elements. Network 12 may implement a UDP/IP connection and use a TCP/IP communication language protocol in particular embodiments of the present disclosure.

CPEs 36*a-i* can be associated with clients, customers, or end users wishing to initiate a communication in communication system 10 via some network. The term 'CPE' is inclusive of devices used to initiate a communication such as a receiver, a computer, a set-top box, an Internet radio device (IRD), a cell phone, a telephone, a router, a switch, a residential gateway (RG), a fixed mobile convergence product, a home networking adaptor, an internet access gateway, a smartphone (e.g., a Google Droid, an iPhone), a tablet (e.g., an iPad), a personal digital assistant (PDA), or any other device, component, element, or object capable of initiating voice, audio, video, media, or data exchanges within communication system 10. CPEs 36*a-i* may also be inclusive of a suitable interface to the human user, such as a display, a keyboard, a touchpad, a remote control, or other terminal equipment. CPEs 36*a-i* may also be any device that seeks to initiate a communication on behalf of another entity or element, such as a program, a database, or any other component, device, element, or object capable of initiating an exchange within communication system 10. In addition, CPEs 36*a-i* may be any devices that a service provider may deploy within the service provider's own network premises. Data, as used herein in this document, refers to any type of numeric, voice, video, media, or script data, or any type of source or object code, or any other suitable information in any appropriate format that may be communicated from one point to another.

DHCP server 38 and access concentrator 16 are network elements that can facilitate the network communication activities discussed herein. As used herein in this Specification, the term 'network element' is meant to encompass routers, switches, cable boxes, gateways, bridges, loadbalancers, cable CMTS routers, DSLAMs, cellular access concentrators, WiMAX access concentrators, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms, communication protocols, and interfaces that allow for the effective exchange of data or information.

In one implementation, DHCP server 38 and/or access concentrator 16 include software to achieve (or to foster) the network communication activities discussed herein. This could include, for example, the implementation of instances of routing module 18 (where these modules interact, perform reciprocating functions, and/or suitably coordinate their activities with peers). Additionally, each of these elements can have an internal structure (e.g., a processor, a memory element, etc.) to facilitate some of the operations described herein. In other embodiments, these network communication activities may be executed externally to these elements, or included in some other network element to achieve the intended functionality. Alternatively, DHCP server 38 and/or access concentrator 16 may include software (or reciprocating software) that can coordinate with other network elements in order to achieve the network communication activities described herein. In still other embodiments, one or several devices may include any suitable algorithms, hardware, software, components, modules, interfaces, or objects that facilitate the operations thereof.

Turning to FIG. 2A, FIG. 2A is a simplified flowchart 200 illustrating one potential operation associated with the present disclosure to obtain lost CPE information. At 202, a cable modem goes offline for any number of reasons. For example, cable modem 34*a* may go offline due to some type of network connectivity malfunction. At 204, the IPv6 CPE information on a CMTS corresponding to the CPE behind the cable modem is deleted (due to the cable modem going offline). For example, the CPE information related to CPEs 36*a-c* that are behind cable modem 34*a* would be deleted from access concentrator 16. At 206, the cable modem comes back online.

At 208, the system can determine if a received packet is from a CPE. For example, when access concentrator 16 receives a packet, access concentrator 16 determines if the packet is from CPE 36*a*. Because access concentrator 16 has lost CPE 36*a* data, when access concentrator 16 receives a packet after cable modem 34*a* comes back online, access concentrator 16 does not know if the IPv6 data is for CPE 36*a* (operating behind cable modem 34*a*). If the received packet is from a CPE, then access concentrator 16 can obtain the IPv6 data from the received packet. Further, if the received packet is from a CPE, then reverse path forwarding is performed, as illustrated in 210. In addition, the system can determine if reverse path forwarding operation was successful, as illustrated in 212. If reverse path forwarding was not successful, then the packet is dropped, as illustrated in 228. If reverse path forwarding operation was successful, then a source verify is performed and IPv6 data is reconstructed using Neighbor Discovery data and DHCPv6 Leasequery data, as illustrated in 214. For example, access concentrator 16 may perform a source verify and reconstruct the IPv6 data for CPE 36*a* using Neighbor Discovery data and DHCP server 38 Leasequery data. Note that the term 'data' is meant to include any type of information found in packets, memory (e.g., inclusive of databases, caches, etc.), identified in responses, provided in messages, provided in pings (or responses to pings), provisioned or configured, or any other suitable information that may be used (i.e., gleaned, identified, etc.) in the scenarios discussed herein.

At 216, the system can determine if the source verify operation was successful. If the source verify was not successful, then the packet is dropped, as illustrated in 228. If the source verify was successful, then the system can determine if the received packet is destined to a CPE, as illustrated in 220. Returning to 208, if the received pack is not from a CPE (or if the origin of the received packet is unknown), then the system can determine if the received packet is destined to a CPE, as illustrated in 220. For example, access concentrator 16 may determine that the received packet is destined to CPE 36*a*.

If the received packet is destined to a CPE, then a downstream route lookup is performed and the IPv6 data is reconstructed using Neighbor Discovery data and DHCPv6 Leasequery data. For example, access concentrator 16 may perform a downstream route lookup (at any appropriate network location), and reconstruct the IPv6 data for CPE 36a using Neighbor Discovery data and DHCP server 38 Leasequery data. At 224, the system can determine if the downstream route lookup operation was successful. If the downstream route lookup was not successful, then the packet is dropped, as illustrated in 228. If the downstream route lookup operation was successful, then the packet is forwarded to its destination, as illustrated in 226. Returning to 220, if the received packet is not destined to a CPE, then the packet is forwarded to its destination, as illustrated in 226.

Turning to FIG. 2B, FIG. 2B is a simplified flowchart 201 illustrating continued operations associated with the present disclosure to obtain lost CPE information. At 230, a CMTS reloads (e.g., access concentrator 16 may reload). At 232, the system can determine if Bulk Leasequery is turned on (e.g., the Bulk Leasequery protocol, messaging, paradigm, etc. is turned on). If Bulk Leasequery is not turned on, then the process ends. If Bulk Leasequery is turned on, then a Bulk Leasequery is issued, as illustrated in 234. For example, after access concentrator 16 has reloaded, IPv6 data may have been lost. By issuing a Bulk Leasequery, access concentrator 16 may be able to retrieve the lost IPv6 data. At 236, cable modems are filtered out of the Bulk Leasequery results. By filtering out the cable modems (filtering their particular identifiers), only CPEs (their particular identifiers) remain in the Bulk Leasequery results.

At 238, the system can determine if a cable modem in front of a CPE (identified in the Bulk Leasequery) is online. If the cable modem is not online, then the CPE is ignored, as illustrated in 240. At 248, the system can determine if there is a CPE in the Leasequery results that has not been analyzed. If there is not a CPE in the Leasequery results that has not been analyzed, then the process ends (because all of the CPEs in the Leasequery were analyzed). If there is a CPE in the Leasequery results that has not been analyzed, then the system returns to 238, and determines if a cable modem (in front of a CPE identified in the Bulk Leasequery is online).

If a cable modem is online, then the CPE is pinged, as illustrated in 242. For example, access concentrator 16 may ping CPE 36a. At 244, the system can determine if a response to the ping was received. If a response to the ping was not received, then the CPE is ignored, as illustrated in 240, where the system can determine if there is a CPE in the Leasequery results that has not been analyzed, as illustrated in 248.

If a response to the ping was received, then a MAC Domain (MD), upstream service flow identifier (SID), MAC address, and an IP address can be populated (also, if found, a prefix in a subscriber database and a RIB are updated), as illustrated in 246. For example, access concentrator 16 may use the response (to the ping from CPE 36a) to determine the MD, SID, MAC address, and IP address of CPE 36a. Also, if subscriber database 24 information and/or RIB 30 information is in the response to the ping, then a prefix in subscriber database 24 and/or RIB 30 is updated. At 248, the system can determine if there is a CPE in the Leasequery results that has not been analyzed.

Figure 3A:
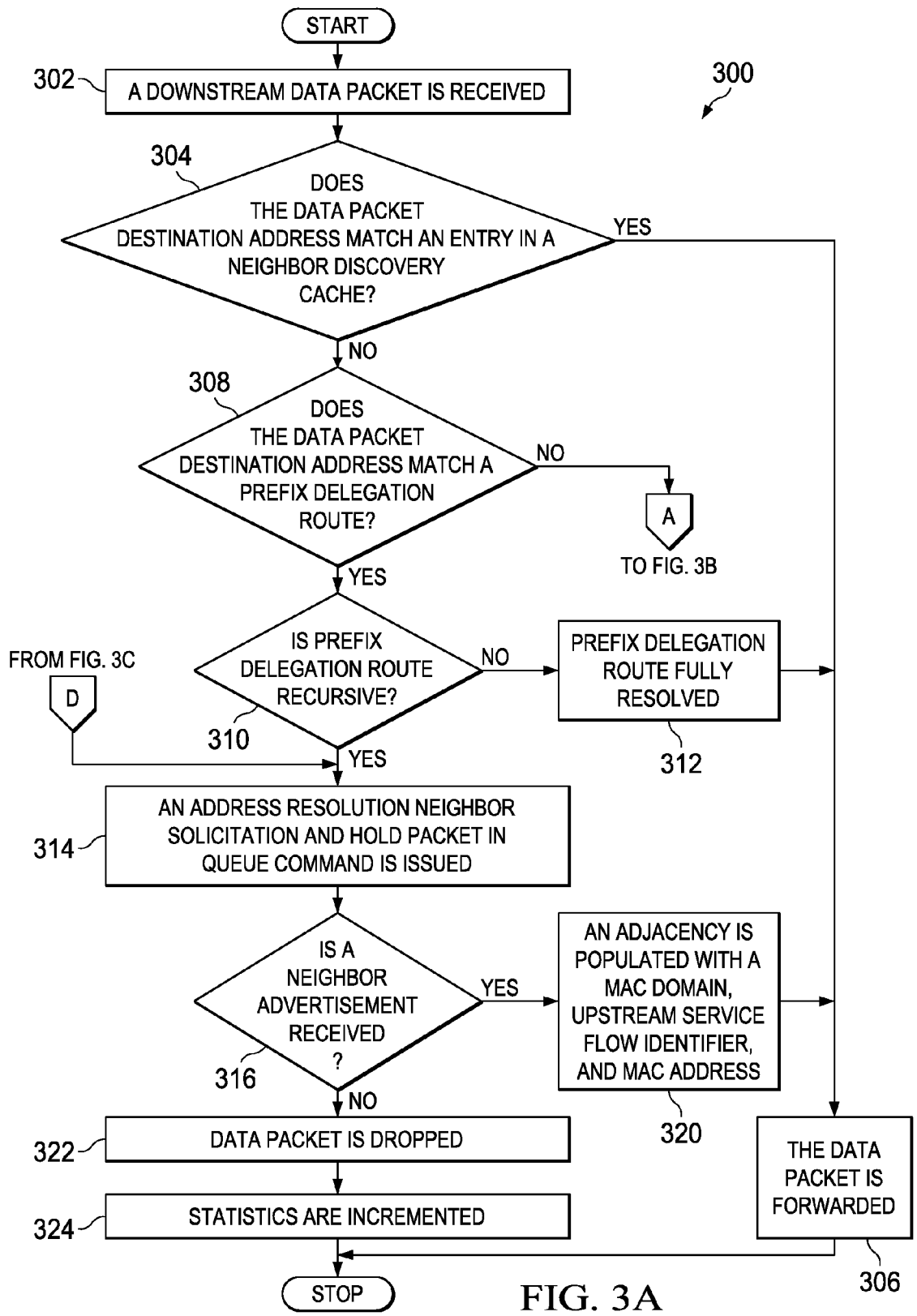
FIG. 3A is another simplified flowchart illustrating potential operations associated with the present disclosure.

Turning to FIG. 3A, FIG. 3A (along with FIGS. 3B and 3C) reflects a simplified flowchart 300 illustrating one potential operation associated with the present disclosure to obtain lost CPE information. At 302, a downstream data packet is received. At 304, the system can determine if the data packet destination address matches an entry in a neighbor cache. For example, access concentrator 16 may determine if a data packet destination address matches an entry in neighbor discovery cache 40. If the data packet destination address matches an entry in the neighbor cache, then the data packet is forwarded to the destination address, as illustrated in 306.

If the data packet destination address does not match an entry in the neighbor cache, then the system can determine if the data packet destination address matches a prefix delegation route, as illustrated in 308. For example, access concentrator 16 may determine if the data packet destination address matches a prefix delegation route in RIB 30. If the data packet destination address matches a prefix delegation route, then the system can determine if the prefix delegation route is recursive, as illustrated in 310. If the prefix delegation route is not recursive, then the prefix delegation route is considered fully resolved (as illustrated in 312) and at 306, the data packet is forwarded to the destination address.

If the prefix delegation route is recursive, then an address resolution neighbor solicitation is issued and a 'hold packet in queue command' is issued, as illustrated in 314. At 316, the system can determine if a neighbor advertisement is received. The neighbor advertisement message confirms the existence of a host or router (e.g., cable modem 34a), and also provides link-layer address information when needed. If the neighbor advertisement is received, then an adjacency is populated with a MAC Domain, SID, and a MAC address, as illustrated in 320. At 306, the data packet is forwarded. If the neighbor advertisement is not received, then the data packet is dropped, as illustrated in 322. In an embodiment, statistics are incremented at 324. Statistics may be incremented to track the number of dropped data packets, as well as other information that may be used to analyze communication system 10. The statistics may be stored in memory 24, or in any other appropriate location.

Figure 3B:
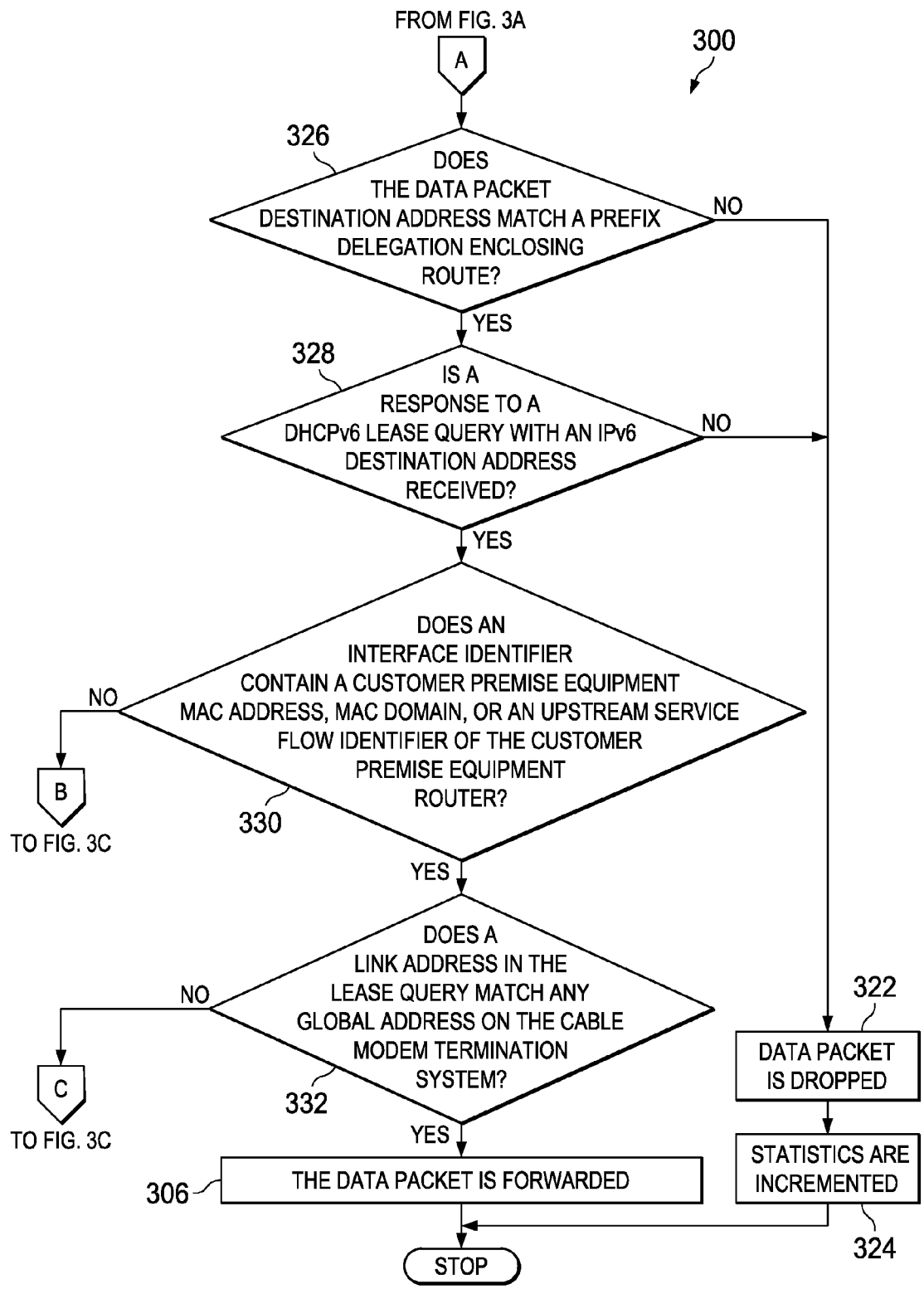
FIG. 3B is another simplified flowchart illustrating potential operations associated with the present disclosure.

Returning to 308, if the data packet destination address does not match a prefix delegation route, then the system determines if the data packet destination address matches a prefix delegation enclosing route, as illustrated in 326 of FIG. 3B. If the data packet destination address does not match a prefix delegation enclosing route, then the data packet is dropped, and statistics are incremented. If the data packet destination address does match a prefix delegation enclosing route, then the system can determine if a response to a DHCPv6 Leasequery with an IPv6 destination address is received, as illustrated in 328. If a response to a DHCPv6 Leasequery with an IPv6 destination address is not received, then the data packet is dropped, and the statistics are incremented.

If a response to a DHCPv6 Leasequery with an IPv6 destination address is received, then the system determines if an interface identifier may include a CPE MAC address, MAC Domain, or a SID of the CPE router, as illustrated in 330. If the system determines that an interface identifier does not contain a CPE MAC address, MAC Domain, or a SID of the CPE router, then a DOCSIS 3.0 CM MAC address option in the relay-forward of the DHCPv6 Leasequery reply (which may include a cable modem MAC address) is used to lookup the MAC Domain and the SID in a subscriber database, as illustrated in 336.

If the system determines that an interface identifier does contain a CPE MAC address, MAC Domain, or a SID of the CPE router, then the system can determine if a link-address in the Leasequery matches any global address on the cable modem termination system, as illustrated in 332. If the link-address in the Leasequery matches any global address on the cable modem termination system, then the data packet is forwarded, as illustrated in 306.

Figure 3C:
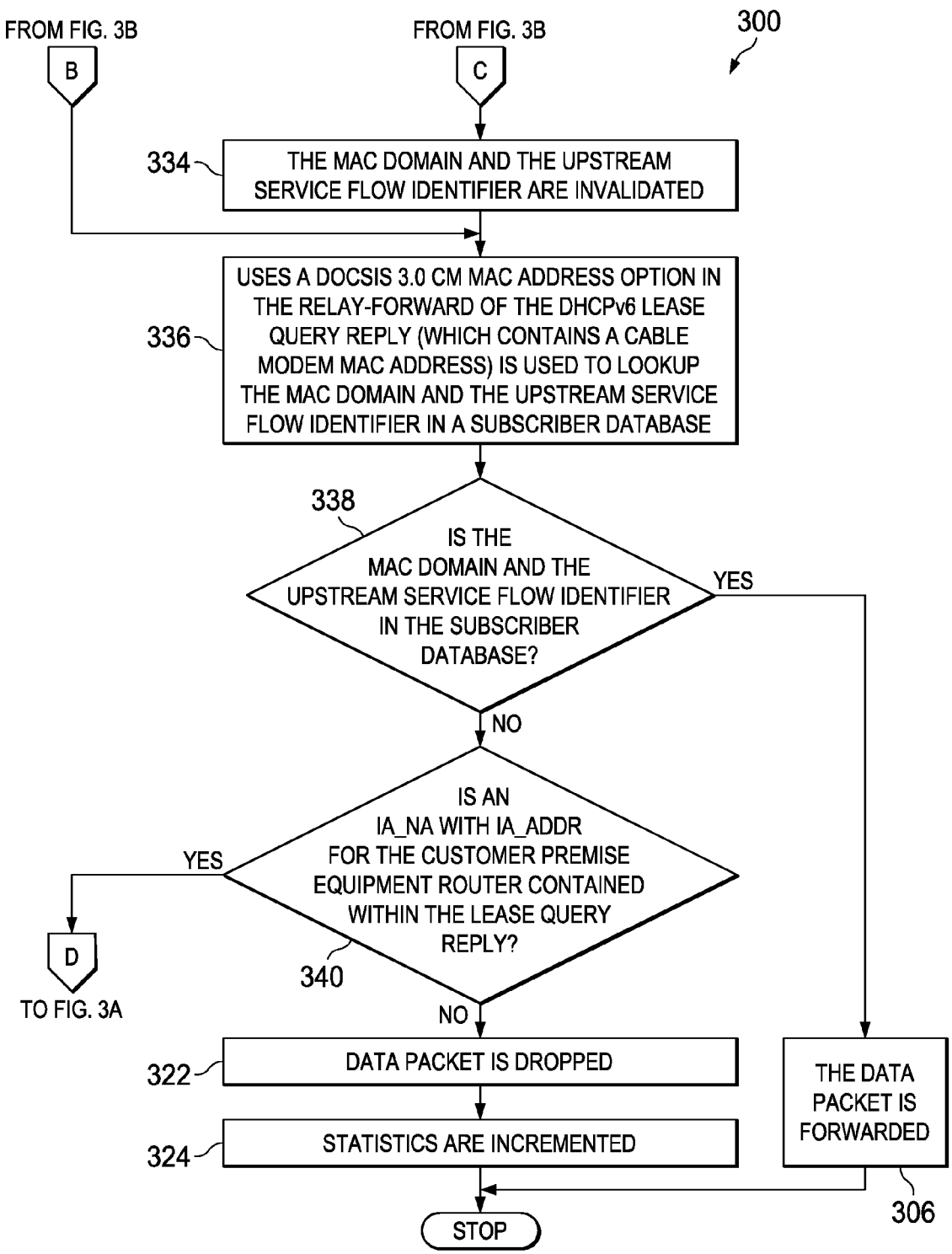
FIG. 3C is another simplified flowchart illustrating potential operations associated with the present disclosure.

Turning to FIG. 3C, if the link-address in the Leasequery does not match any global address on the cable modem termination system, then the MAC Domain and the SID is invalidated, as illustrated in 334. At 336, a DOCSIS 3.0 CM MAC address option in the relay-forward of the DHCPv6 Leasequery reply (which may include a cable modem MAC address) is used to lookup the MAC Domain and the SID in a subscriber database. At 338, the system determines if the MAC Domain and the SID is in the subscriber database.

If the MAC Domain and the SID are in the subscriber database, then the data packet is forwarded, as illustrated in 306. If the MAC Domain and SID are not in the subscriber database, then the system determines if an IA_NA with IA_ADDR for the CPE router is contained within the Leasequery reply, as illustrated in 340. If the IA_NA with IA_ADDR for the CPE router is not contained within the Leasequery reply, then the data packet is dropped, and the statistics are incremented, as discussed previously. If the MAC Domain and SID are in the subscriber database, then the system provides an address resolution neighbor solicitation and a 'hold packet in queue command' is issued, as illustrated in 314. The above described route lookup for a downstream packet may allow for the automated recovery of lost CPE information. Note that the MAC Domain and upstream service flow identifier together represent the link-layer source of a packet in a cable ((e.g., DOCSIS) network. Other access concentrator networks may use other identifiers to determine the link-layer source of a packet.

Figure 4B:
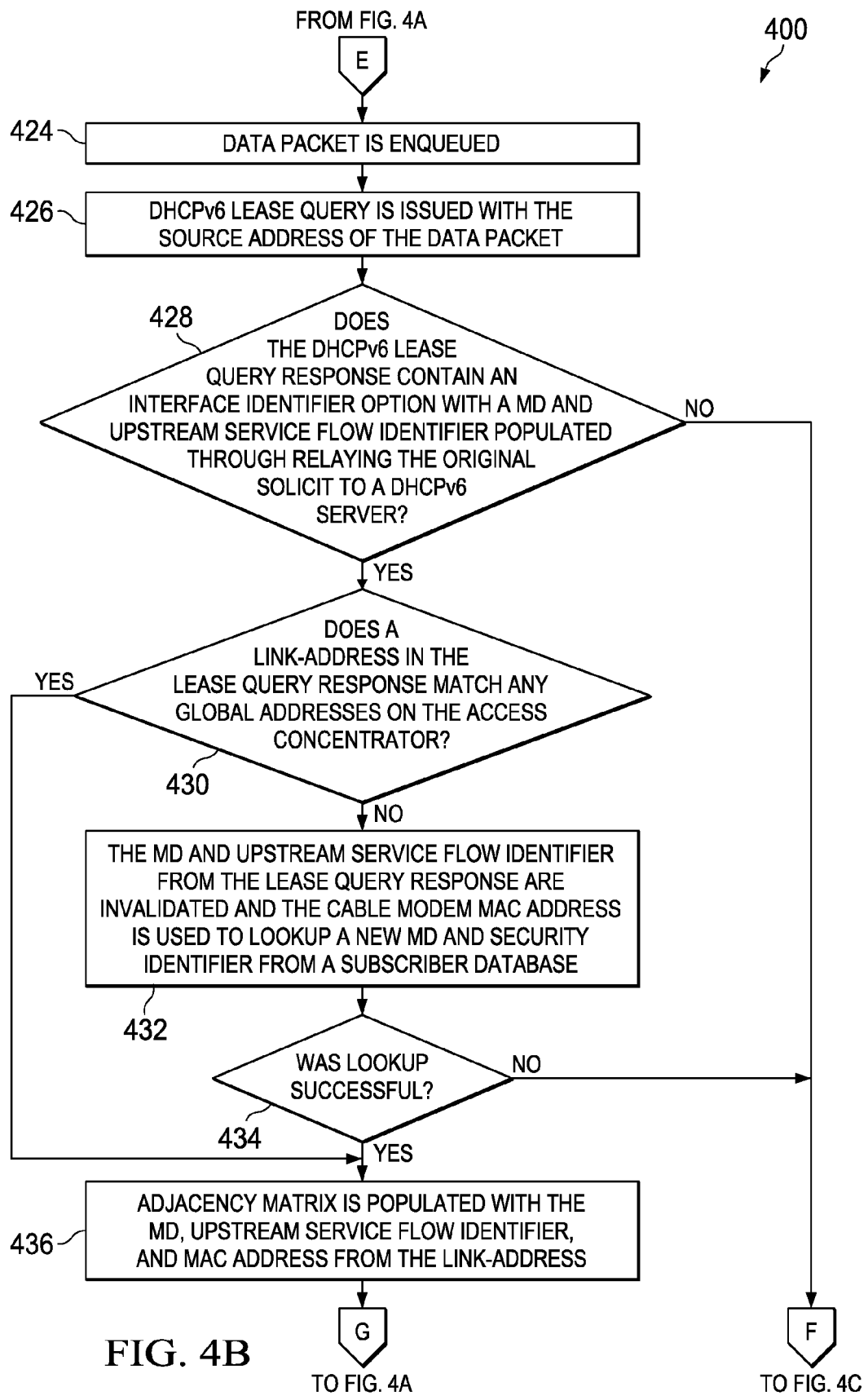
FIG. 4B is another simplified flowchart illustrating potential operations associated with the present disclosure.

Turning to FIG. 4A, FIG. 4A (along with FIGS. 4B and 4C) reflects a simplified flowchart 400 illustrating one potential operation associated with the present disclosure to obtain lost CPE information. At 402, a prefix delegation enclosing route command line interface is configured. At 404, an upstream data packet arrives at an access controller and enters a fast path. At 405, the system can determine if the source verify is enabled. If the source verify is not enabled, then the data packet is forwarded, as illustrated in 418. If the source verify is enabled, then the system can determine if a source address for the data packet matches a neighbor cache entry, as illustrated in 406.

If the source address for the data packet matches a neighbor cache entry, then the system can determine if an MD and SID are in an adjacency structure, as illustrated in 412. If the MD and the SID are in an adjacency structure, then the system can determine if the MD, the SID, and (optionally) a MAC address match the source address, as illustrated in 416. If the MD, the SID, and (optionally) a MAC address match the source address, then the data packet is forwarded (e.g., passed on to the next feature), as illustrated in 418. If the MD, the SID, and (optionally) the MAC address do not match the source address, then the traffic related to the data packets is dropped, as illustrated in 420 shown in FIG. 4C (discussed in detail below). In certain embodiments, statistics are then incremented at 422. Statistics may be incremented to track the number of dropped data packets, as well as other information that may be used to analyze communication system 10. The statistics may be stored in memory 24, or in any other appropriate location.

Returning to 406, if the source address for the data packet does not match a Neighbor Discovery cache entry, then the system determines if the source address matches a prefix delegation route, as illustrated in 408. If the source address matches a prefix delegation route, then the system determines if an MD and SID are in an adjacency structure, as illustrated in 412. If the source address does not match a prefix delegation route, then the system determines if the source address matches a prefix delegation enclosing route, as illustrated in 410. If the source address does not match a prefix delegation enclosing route, then the system can determine if an MD and SID are in an adjacency structure, as illustrated in 412. If the source address matches a prefix delegation enclosing route, then traffic associated with the data packet is sent to a slow path, as illustrated in 414.

Turning to FIG. 4B and continuing with the previous operations, the data packet is enqueued at 424. At 426, a DHCPv6 Leasequery is issued with the source address of the data packet. At 428, the system can determine if the DHCPv6 Leasequery response includes an interface-identifier option with an MD and SID populated through relaying the original SOLICIT to a DHCPv6 server.

Figure 4C:
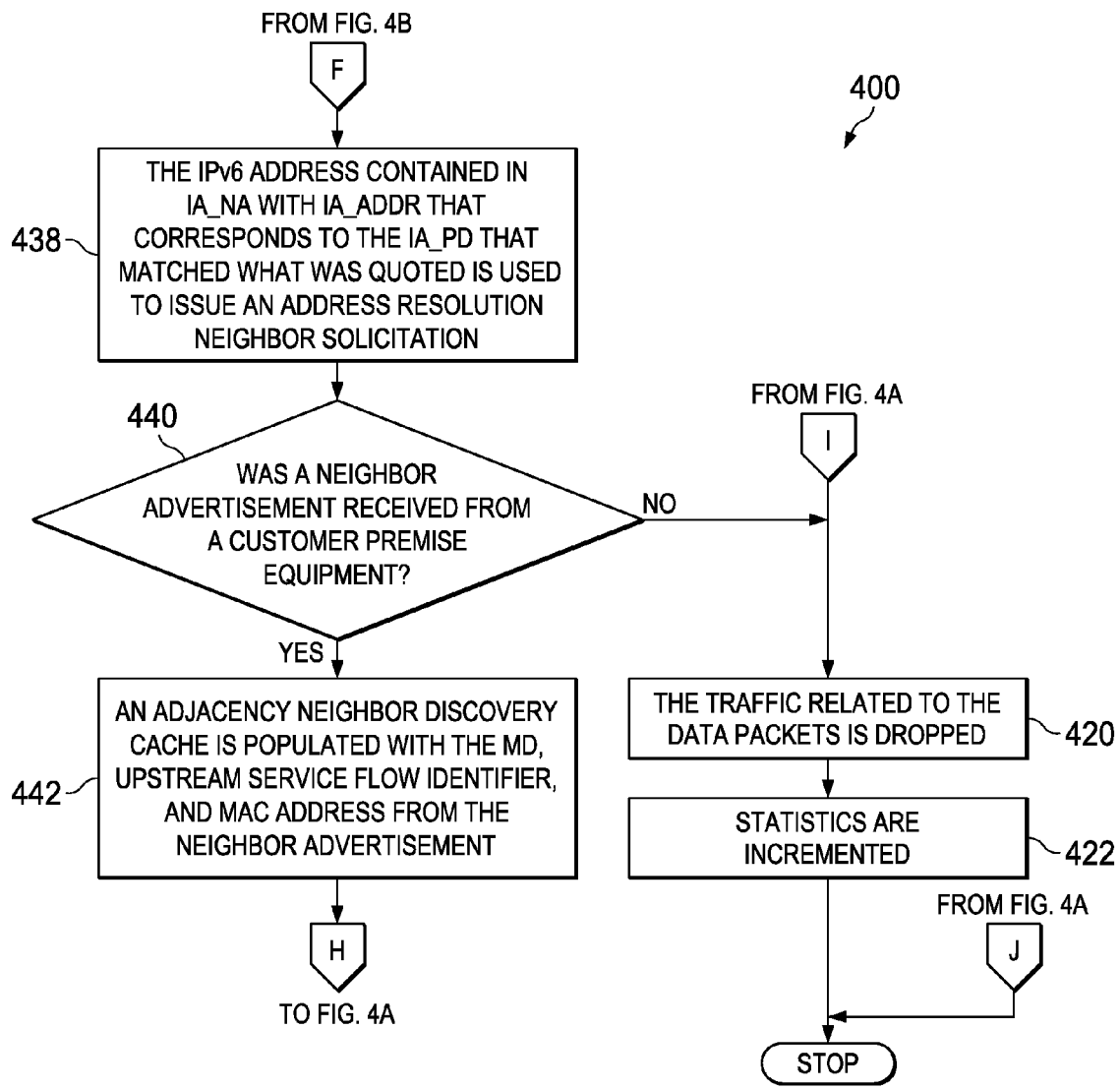
FIG. 4C is another simplified flowchart illustrating potential operations associated with the present disclosure.

If the DHCPv6 Leasequery response does not contain an interface-identifier option with an MD and SID populated through relaying the original SOLICIT to a DHCPv6 server, then the IPv6 address (contained in the IA_NA with IA_ADDR that corresponds to the IA_PD that matched what was quoted) is used to issue an address resolution neighbor solicitation, as illustrated in 438 of FIG. 4C. If the IPv6 Leasequery response does contain an interface identifier option with an MD and SID populated through relaying the original SOLICIT to a DHCPv6 server, then the system can determine if a link-address in the Leasequery response matches any global addresses on the access concentrator, as illustrated in 430.

If the link-address in the Leasequery response matches any global addresses on the access concentrator, then the adjacency structure is populated with the MD, SID, and MAC address from the link-address, as illustrated in 436. At 416 (illustrated in FIG. 4A), the system can determine if the MD, the SID, and (optionally) a MAC address match the source address. If the link-address in the Leasequery response does not match any global addresses on the access concentrator, then the MD and SID from the LQ response are invalidated, and the cable modem MAC address is used to lookup a new MD and SID from a subscriber database, as illustrated in 432.

At 434, the system can determine if the lookup operation was successful. If the lookup operation was successful, then the adjacency matrix is populated with the MD, SID, and MAC address from the link-address. As noted previously, at 416 (FIG. 4A), the system can determine if the MD, the SID, and (optionally) a MAC address match the source address. If the lookup was not successful, then the IPv6 address (contained in the IA_NA with IA_ADDR that corresponds to the IA_PD that matched what was quoted) is used to issue an address resolution neighbor solicitation, as illustrated in 438 of FIG. 4C.

At 440, the system can determine if a neighbor advertisement was received from a CPE. If a neighbor advertisement was not received from a CPE, then the traffic related to the data packets is dropped, as illustrated in 420. Statistics are incremented at 422 to track the number of dropped data packets. If a neighbor advertisement was received from a CPE, then an entry in CMTS subscriber database is populated with the MD, the SID, and a MAC address from the neighbor advertisement, as illustrated in 442. The above described source verification for a packet that arrives at an access concentrator may allow for the automated recovery of lost CPE information.

Turning to FIG. 5, FIG. 5 is a simplified flowchart 500 illustrating one potential operation associated with the present disclosure to obtain lost CPE information. At 502, a user configures a special prefix delegation enclosing route and an interface for each interface that may include prefix delegations. At 504, a data packet arrives on an upstream cable. At

506, the system can determine if reverse path forwarding is turned on. If reverse path forwarding is not turned on, then the data packet is forwarded (i.e., passed), as illustrated in 516.

If reverse path forwarding is turned on, then the system can determine if a route for the data packet is found in a routing table lookup on the data packet source address (for a specific prefix delegation route), as illustrated in 508. If a route for the data packet is found in a routing table lookup on the data packet source address for specific prefix delegation route, then the system can determine if a source interface matches an adjacency, as illustrated in 514. An adjacency structure may include the basic information necessary for forwarding a packet and can be looked up in the forwarding table (e.g., by using the IP address and/or the Virtual Routing and Forwarding (VRF) table instance identifier).

The adjacency structure may include the output interface, MAC rewrite string information, MD and SID for Source Verify, etc. In the case of RPF, the source IP address of the packet is used for lookup and the source interface in the adjacency is matched against the source interface of the packet. If a source interface matches an adjacency, then the data packet is forwarded (i.e., passed), as illustrated in 516. If a source interface does not match an adjacency, then the data packet is dropped, as illustrated in 512. In an embodiment, statistics are incremented at 518. Statistics may be incremented to track the number of dropped data packets, as well as other information that may be used to analyze communication system 10. The statistics may be stored in memory 24, or in any other appropriate location.

Returning to 508, if a route for the data packet is not found in a routing table lookup on the data packet source address for a specific prefix delegation route, then the system can determine if a route for the data packet is found in a routing table lookup on the data packet source address for a special prefix delegation enclosing route, as illustrated in 510. If a route for the data packet is found in a routing table lookup on the data packet source address for a special prefix delegation enclosing route, then the system can determine if a source interface matches an adjacency, as illustrated in 514. If a route for the data packet is not found in a routing table lookup on the data packet source address for a special prefix delegation enclosing route, then the data packet is dropped, as illustrated in 512. Statistics can then be incremented. The above described process for a data packet that arrives on an upstream cable may allow for an automated recovery of lost CPE information.

Note that in certain example implementations, the functions outlined herein to recover lost information for certain devices may be implemented in logic encoded in one or more non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory [as shown in FIG. 1A] can store data used for the operations described herein. This includes the memory being able to store instructions (e.g., software, logic, processor instructions, etc.) that can be executed to carry out the activities described in this Specification. A processor can execute any type of instructions associated with the data to achieve the operations detailed herein in this Specification. In one example, the processor [as shown in FIG. 1A] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Furthermore, any of the memory items discussed herein (e.g., memory 22*a* and 22*b*, subscriber database 24 cable modem database 26, CPE database 28, routing information base 30, forwarding information base 32, Neighbor Discovery cache 40, tables, trees/M-TRIE, etc.) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding flow diagrams illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols (e.g., involving various RFCs), communication system 10 may be applicable to other protocols and arrangements. Additionally, communication system 10 may work with other access concentrator systems that use different Layer 2 subscriber identifiers.

Moreover, the present disclosure is equally applicable to various technologies, aside from DSL architectures, as these have only been offered for purposes of discussion.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a packet in a data stream;
   determining that an access concentrator has lost customer premise equipment information related to the received packet, wherein the lost customer premise equipment information includes prefix delegation route information;
   evaluating the received packet to determine if the received packet is from customer premise equipment or is destined for the customer premise equipment; and
   obtaining the customer premise equipment information that is lost by evaluating Neighbor Discovery data and dynamic host configuration protocol version six (DHCPv6) lease query data, wherein data related to customer premise equipment behind a cable modem that is offline is filtered from the DHCPv6 lease query data, wherein a source verify operation is used in response to the received packet being from the customer premise equipment associated with the customer premise equipment information and a reverse path forwarding operation was successful, and wherein a downstream route lookup is used in response to the received packet being destined for the customer premise equipment.

2. The method of claim 1, further comprising:
   communicating a Bulk Leasequery message;
   receiving a response to the Bulk Leasequery message; and
   filtering out cable modem identifiers from the response to the Bulk Leasequery message.

3. The method of claim 1, further comprising:
   determining a status for a cable modem as being online or offline;
   determining that the received packet originated from the customer premise equipment; and
   using the Neighbor Discovery data and the DHCPv6 query data to obtain the customer premise equipment information.

4. The method of claim 1, further comprising:
   determining a status for a cable modem as being online or offline;
   determining that the received packet was destined for a particular customer premise equipment; and
   performing the downstream route lookup operation to create a Neighbor Discovery message and a DHCPv6 Leasequery to obtain particular customer premise equipment information for the particular customer premise equipment.

5. The method of claim 1, further comprising:
   comparing a destination address of the received packet with an entry in a neighbor cache to determine the customer premise equipment information.

6. The method of claim 1, further comprising:
   comparing a source address of the received packet with an entry in a neighbor cache to determine the customer premise equipment information.

7. The method of claim 1, further comprising:
   comparing a link-address in a DHCPv6 Leasequery to a plurality of addresses in the access concentrator to obtain the customer premises equipment information.

8. The method of claim 1, further comprising:
   determining if a packet destination address for a particular packet matches a prefix delegation route;
   determining if the packet destination address matches a prefix delegation enclosing route;
   determining whether a response is received for a DHCPv6 Leasequery; and
   dropping the particular packet.

9. The method of claim 1, further comprising:
   reconstructing IPv6 data for a particular customer premise equipment using particular Neighbor Discovery data and particular DHCPv6 Leasequery data after the source verify operation.

10. A system comprising:
    memory;
    a hardware processor; and
    logic encoded in one or more non-transitory media that includes instructions for execution and when executed by the hardware processor is operable to perform operations, comprising:
      receiving a packet in a data stream;
      determining that an access concentrator has lost customer premise equipment information related to the received packet, wherein the lost customer premise equipment information includes prefix delegation route information;
      evaluating the received packet to determine if the received packet is from customer premise equipment or is destined for the customer premise equipment; and
      obtaining the customer premise equipment information that is lost by evaluating Neighbor Discovery data and dynamic host configuration protocol version six (DHCPv6) lease query data, wherein data related to customer premise equipment behind a cable modem that is offline is filtered from the DHCPv6 lease query data, wherein a source verify operation is used in response to the received packet being from the customer premise equipment associated with the customer premise equipment information and a reverse path forwarding operation was successful, and wherein a downstream route lookup is used in response to the received packet being destined for the customer premise equipment.

11. The system of claim 10, the operations further comprising:
    communicating a Bulk Leasequery message;
    receiving a response to the Bulk Leasequery message; and
    filtering out cable modem identifiers from the response to the Bulk Leasequery message.

12. The system of claim 10, the operations further comprising:
    determining a status for a cable modem as being online or offline;

determining that the received packet originated from the customer premise equipment; and using the Neighbor Discovery data and the DHCPv6 query data to obtain the customer premise equipment information.

13. The system of claim 10, the operations further comprising:

determining a status for a cable modem as being online or offline;

determining that the received packet was destined for a particular customer premise equipment; and performing the downstream route lookup operation to create a Neighbor Discovery message and a DHCPv6 Leasequery to obtain particular customer premise equipment information for the particular customer premise equipment.

14. The system of claim 10, the operations further comprising:

comparing a destination address of the received packet with an entry in a neighbor cache to determine the customer premise equipment information.

15. The system of claim 10, the operations further comprising:

comparing a source address of the received packet with an entry in a neighbor cache to determine the customer premise equipment information.

16. The system of claim 10, the operations further comprising:

comparing a link-address in a DHCPv6 Leasequery to a plurality of addresses in the access concentrator to obtain the customer premises equipment information.

17. The system of claim 10, the operations further comprising:

determining if a packet destination address for a particular packet matches a prefix delegation route;

determining if the packet destination address matches a prefix delegation enclosing route;

determining whether a response is received for a DHCPv6 Leasequery; and dropping the particular packet.

18. A device, comprising:

a processor coupled to memory to execute instructions to provide:

a routing module configured for:

receiving a packet in a data stream;

determining that the network element has lost customer premise equipment information related to the received packet, wherein the lost customer premise equipment information includes prefix delegation route information;

evaluating the received packet to determine if the received packet is from customer premise equipment or is destined for the customer premise equipment; and obtaining the customer premise equipment information that is lost by evaluating Neighbor Discovery data and dynamic host configuration protocol version six (DHCPv6) lease query data, wherein data related to customer premise equipment behind a cable modem that is offline is filtered from the DHCPv6 lease query data, wherein a source verify operation is used in response to the received packet being from the customer premise equipment associated with the customer premise equipment information and a reverse path forwarding operation was successful, and wherein a downstream route lookup is used in response to the received packet being destined for the customer premise equipment.

19. A device of claim 18, wherein the routing module is further configured for:

communicating a Bulk Leasequery message;

receiving a response to the Bulk Leasequery message; and filtering out cable modem identifiers from the response to the Bulk Leasequery message.

20. A device of claim 18, wherein the routing module is further configured for:

determining a status for a cable modem as being online or offline;

using the Neighbor Discovery data and the DHCPv6 query data to obtain the customer premise equipment information if the received packet originated from the customer premise equipment; and performing the downstream route lookup operation to create a Neighbor Discovery message and a DHCPv6 Leasequery to obtain particular customer premise equipment information for the customer premise equipment.

* * * * *